United States Patent [19]
Kim

[11] Patent Number: 5,654,765
[45] Date of Patent: Aug. 5, 1997

[54] CHANNEL EQUALIZER FOR DIGITAL TELEVISION RECEIVER HAVING AN INITIAL COEFFICIENT STORAGE UNIT

[75] Inventor: Dae Jin Kim, Seoul, Rep. of Korea

[73] Assignee: Goldstar Co., Ltd., Seoul, Rep. of Korea

[21] Appl. No.: 341,178

[22] Filed: Nov. 18, 1994

[30] Foreign Application Priority Data

Nov. 18, 1993 [KR] Rep. of Korea ............... 24644/1993

[51] Int. Cl.$^6$ ........................................... H04N 5/213
[52] U.S. Cl. ................... 348/614; 348/624; 348/909; 364/724.2; 375/232; 455/65; 455/186.1; 455/296
[58] Field of Search ........................... 348/614, 624, 348/607, 909, 914, 553, 731, 725; 375/11, 12, 13, 14, 15, 101, 103, 99, 229–236; 333/18; 455/65, 185.1, 186.1, 296; 364/724.2, 825; H04N 5/21, 5/213

[56] References Cited

U.S. PATENT DOCUMENTS

| | | | |
|---|---|---|---|
| 4,698,680 | 10/1987 | Lewis, Jr. et al. | 358/166 |
| 4,718,073 | 1/1988 | Takaoka | 375/14 |
| 5,020,078 | 5/1991 | Crespo | 375/12 |
| 5,282,155 | 1/1994 | Jones | 364/724.19 |
| 5,317,595 | 5/1994 | Ostman | 375/14 |
| 5,345,274 | 9/1994 | Matsunaga | 348/614 |

FOREIGN PATENT DOCUMENTS

| | | | |
|---|---|---|---|
| 0466500 | 1/1992 | European Pat. Off. | H04N 5/21 |
| 0516216 | 12/1992 | European Pat. Off. | H04N 5/21 |
| 59-178083 | 10/1984 | Japan | 358/905 |
| 60-130271 | 7/1985 | Japan | 358/905 |
| 2254872 | 10/1990 | Japan | 358/905 |

OTHER PUBLICATIONS

IEEE Transaction on consumer electronics, vol. 36 No. 4, Nov. 30, 1990, New York U.S., pp. 819–824, XP0001789985 IGA et. al. "Ghost Clean System".

IEEE 1992 International Conference on Consumer Electronics, Digest of Technical Papers, Jun. 2–4, 1992, Rosemont, Illinois, US, pp. 6–7, XP000369162, BHATT et al. "The Advanced Digital Television (ADTV) Transmission System".

IEEE Transaction on Consumer Electronics, vol. 38, No. 3 Aug. 1992, New York U.S. pp. 119–126, XP000311825, Peloso R. "Adaptive Equalization For Advanced Television".

ICASSP–93 IEEE International Conference on Acoustics, Speech, and Signal Processing Apr. 27–30, 1993 Minneapolis, Minnesoto, USA, vol. IV of V, Statistical Signal and Array Processing, pp. 176–179, XP000437038 Nicolas et al. "Equalization and Interference Rejection for the Terrestrial Broadcast of Digital HDTV".

IEEE Journal on Selected Areas in Communication., vol. 11, No. 1, Jan. 30, 1993, New York US, pp. 119–125, XP000378003 Hulyalkar "Advanced Digital HDTV Transmission System for Terrestrial Video Simulcasting".

A04–192887, Oct. 1992, Japan (abstract only).

A63–200687, Aug. 1988, Japan (abstract only).

A01–027376, Jan. 1989, Japan (abstract only).

*Primary Examiner*—John K. Peng
*Assistant Examiner*—John W. Miller

[57] ABSTRACT

A channel equalizer for a digital television receiver which filters an input signal to remove a noise component mixed therewith during transmission. The channel equalizer comprises an initial coefficient storage unit for outputting a predetermined coefficient to channel equalizer circuit when a certain channel is firstly selected. The predetermined coefficient is used as an initial filtering value for allowing the channel equalizer circuit to update a filtering coefficient so that it can converge on an optimum value. The stored filtering coefficient is output to the channel equalizer circuit when the firstly selected channel is again selected, so that it can be used as the initial filtering value.

18 Claims, 3 Drawing Sheets

CHANNEL EQUALIZER FOR DIGITAL TELEVISION RECEIVER HAVING AN INITIAL COEFFICIENT STORAGE UNIT

BACKGROUND OF THE INVENTION

1. Field of the Invention

The present invention relates in general to a channel equalizer for a digital television (TV) receiver, and more particularly to a channel equalizer for a digital TV receiver in which a filtering coefficient converging on an optimum value is obtained for a firstly selected channel when an input signal of the firstly selected channel is filtered, the obtained filtering coefficient is stored and the stored filtering coefficient is used as an initial coefficient for filtering the input signal when the firstly selected channel is again selected.

2. Description of the Background Art

Generally, a channel equalizer is provided in a receiver to process a transmission signal in the opposite manner to a channel characteristic to remove an inter-symbol interference of the transmission signal due to a multi-path thereof or a non-linearity of a transmission channel.

Such a channel equalizer must essentially be provided in a digital TV receiver which receives digital data transmitted thereto. Namely, in the digital TV receiver, the channel equalizer is required to remove a ghost due to a multi-path of a digital TV broadcasting signal from a broadcasting station which results from obstacles such as buildings, mountains and etc. The channel equalizer is also required to remove an NTSC interference in which an NTSC signal of the same frequency band is mixed with the digital TV broadcasting signal.

Referring to FIG. 1, there is shown a block diagram of a conventional channel equalizer applied to a digicipher system. The digicipher system performs a convolutional encoding operation for data in the unit of 4 bits to output 5-bit data by converting one least significant bit (LSB) into two bits. Then, the digicipher system transmits the 5-bit data through trellis coded modulation (TCM) and 32 quadrature amplitude modulation (QAM).

As shown in FIG. 1, the channel equalizer comprises a finite impulse response (referred to hereinafter as FIR) filter 1 for filtering an input signal $V_k$, an error detector 3 for detecting a difference between the input signal $V_k$ and an output signal $\hat{I}_k$ from the FIR filter 1, and a coefficient update calculator 2 for updating a filtering coefficient $C_k$ for the filtering of the input signal $V_k$ in the FIR filter 1 in response to the input signal $V_k$ and an output signal $\epsilon_k$ from the error detector 3 and outputting the updated filtering coefficient $C_k$ to the FIR filter 1.

The operation of the conventional channel equalizer with the above-mentioned construction as shown in FIG. 1 will hereinafter be described.

The FIR filter 1 performs the filtering operation for the input signal $V_k$ in the form of a complex number by multiplying it by the updated filtering coefficient $C_k$ from the coefficient update calculator 2. The output signal $\hat{I}_k$ from the FIR filter 1 can be expressed as follows:

$$\hat{I}_k = \sum_{j=-k_1}^{k_2} C_j V_{k-j}$$

Here, $V_{k-j}$, $C_j$ and $\hat{I}_k$ are complex numbers because the digicipher system performs the signal transmission in the form of 32QAM.

The error detector 3 calculates an error or the difference between the input signal $V_k$ and the output signal $\hat{I}_k$ from the FIR filter 1.

The coefficient update calculator 2 includes a coefficient storage unit 2a. The coefficient update calculator 2 updates the filtering coefficient $C_k$ for the filtering of the input signal $V_k$ in the FIR filter 1 every time on the basis of the following equation:

$$C_{j,k+1} = C_{j,k} + \Delta \epsilon_k V_{k-j}$$

$$(j = -k_1, -k+1, \ldots, 0, 1, \ldots k_2)$$

Here, $\Delta$ is a predetermined step size, $\epsilon_k$ is the error detected by the error detector 3 and k is an iteration number. Whenever the input signal is received, the update operation is iteratively performed by the coefficient update calculator 2 so that a set of coefficients $C_{-k_1}, C_{-k_1-1}, \ldots, 0, 1, \ldots C_{k_2}$ can be updated. The updated coefficients are applied to the FIR filter 1 and also stored into the coefficient storage unit 2a for the next iterative operation. As seen from the above equation, the updated filtering coefficient $C_{j,k+1}$ for the present input signal $V_{k-j}$ is obtained by adding the filtering coefficient $C_{j,k}$ for the previous input signal to a value obtained by multiplying the step size $\Delta$, the error $\epsilon_k$ and the present input signal $V_{k-j}$.

Referring to FIG. 2, there is shown a block diagram of a conventional channel equalizer applied to a digital spectrum compatible high definition television (DSC-HD)TV). As shown in this drawing, the channel equalizer comprises a feedforward FIR filter 4 for filtering an input signal $V_k$, a slicer 7 for slicing an output signal $\hat{I}_k$ of the channel equalizer to detect a value between predetermined levels therefrom, a feedback FIR filter 6 for filtering an output signal $\tilde{I}_k$ from the slicer 7, an error detector 8 for detecting a difference between the output signal $\hat{I}_k$ of the channel equalizer and the output signal $\tilde{I}_k$ from the slicer 7 to detect an error between the input signal $V_k$ and the output signal $\hat{I}_k$ of the channel equalizer, an adder 5 for adding an output signal from the feedforward FIR filter 4 to an output signal from the feedback FIR filter 6 to provide the output signal $\hat{I}_k$ of the channel equalizer, and a coefficient update calculator 9 for updating a filtering coefficient $C_k$ in response to the input signal $V_k$, the output signal $\tilde{I}_k$ from the slicer 7 and an output signal $\epsilon_k$ from the error detector 8 and outputting the updated filtering coefficient $C_k$ to the feedforward FIR filter 4 and the feedback FIR filter 6.

The operation of the conventional channel equalizer with the above-mentioned construction as shown in FIG. 2 will hereinafter be described.

The output signal $\hat{I}_k$ from the adder 5 can be expressed as follows:

$$\hat{I}_k = \sum_{j=-k_1}^{0} C_j V_{k-j} + \sum_{j=1}^{k_2} C_j \tilde{I}_{k-j}$$

It can be seen from the above equation that the output signal $\hat{I}_k$ from the adder 5 is obtained by adding the output signal $$\sum_{j=-k_1}^{0} C_j V_{k-j}$$

from the feedforward FIR filter 4 and the output signal $$\sum_{j=-k_1}^{k_2} C_j \tilde{I}_{k-j}$$

from the feedback FIR filter 6. $\hat{I}_{k-j}$ is the output value from the slicer 7 which slices the output signal $\hat{I}_{k-j}$ of the channel equalizer.

The feedforward FIR filter 4 performs the filtering operation for the input signal $V_k$ by multiplying it by the updated filtering coefficient $C_k$ from the coefficient update calculator 9. The feedback FIR filter 6 performs the filtering operation for the output value $\hat{I}_k$ from the slicer 7, which slices the output signal $\hat{I}_k$ of the channel equalizer, by multiplying it by the updated filtering coefficient $C_k$ from the coefficient update calculator 9.

The coefficient update calculator 9 includes a coefficient storage unit 9a. The coefficient update calculator 9 updates the filtering coefficient $C_k$ whenever the input signal is received. The filtering coefficient for the feedforward FIR filter 4 is updated on the basis of the following equation:

$$C_{j,k+1} = C_{j,k} + \Delta \epsilon_k V_{k-j}$$

where, $$j = -k_1, -k_{1+1}, \ldots, 1, 0$$

As seen from the above equation, the updated faltering coefficient $C_{j,k+1}$ for the present input signal is obtained by adding the filtering coefficient $C_{j,k}$ for the previous input signal to a value obtained by multiplying the step size $\Delta$, the error $\epsilon_k$ and the present input signal $V_{k-j}$. Here, $j=-k_1, -k_{1+1}, \ldots, 1, 0$ is for removing an interference appearing as a part of a transmission signal is earlier inputted to the receiver than that under a normal condition.

The filtering coefficient for the feedback FIR filter 6 is updated on the basis of the following equation:

$$C_{j,k+1} = C_{j,k} + \Delta \epsilon_k \tilde{I}_{k-j}$$

where, $$j = 1, 2, 3, \ldots, k_2$$

As seen from the above equation, the updated filtering coefficient $C_{j,k+1}$ for the present input signal is obtained by adding the filtering coefficient $C_{j,k}$ for the previous input signal to a value obtained by multiplying the step size $\Delta$, the error $\epsilon_k$ and the presently sliced signal $\tilde{I}_{k-j}$. Here, $j=1, 2, 3, \ldots, k_2$ for removing an interference appearing as a part of a transmission signal is later inputted to the receiver than that under a normal condition because of reflection from obstacles, for example.

The error detector 8 calculates the error between the input signal $V_k$ and the output signal $\hat{I}_k$ of the channel equalizer. The output signal $\epsilon_k$ from the error detector 8 can be expressed as follows:

$$\epsilon_k = \hat{I}_k - \tilde{I}_k$$

In the conventional channel equalizer applied to the digicipher system or the DSC-HDTV, where the step size $\Delta$ is fixed and an adaptive least mean square (LMS) algorithm is employed to control continuously the filtering coefficient so that a mean square error between the input signal and the output signal of the adaptive filter can reach a minimum value, the calculation mount is not large, but a considerable time is required in obtaining a filtering coefficient converging on an optimum value for removal of a noise such as the ghost. Namely, a convergence speed is low. For this reason, a picture of a changed channel appears on a screen after the lapse of a considerable time from a channel change time point in a digital TV receiver in the case where many multi-path components are present.

SUMMARY OF THE INVENTION

Therefore, the present invention has been made in view of the above problem, and it is an object of the present invention to provide a channel equalizer for a digital TV receiver in which a filtering coefficient converging on an optimum value is obtained for a firstly selected channel when an input signal of the firstly selected channel is filtered for removal of a noise therefrom, the obtained filtering coefficient is stored and the stored filtering coefficient is used as an initial filtering value when the firstly selected channel is again selected, so that the filtering coefficient can rapidly converge on the optimum value upon channel change.

In accordance with the present invention, the above and other objects can be accomplished by a provision of a channel equalizer for a digital television receiver which filters an input signal to remove a noise component mixed therewith during transmission, comprising initial coefficient storage means for outputting a predetermined coefficient to channel equalization means when a certain channel is firstly selected, said predetermined coefficient being used as an initial filtering value for allowing said channel equalization means to update a filtering coefficient so that it can converge on an optimum value, storing the converging filtering coefficient from said channel equalization means and outputting the stored filtering coefficient to said channel equalization means when said firstly selected channel is again selected, so that it can be used as the initial filtering value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description and the accompanying drawings which are given by way of illustration only, and thus are not limitative of the present invention, in which.

DETAILED DESCRIPTION OF THE PREFERRED EMBODIMENTS

Figure 3:
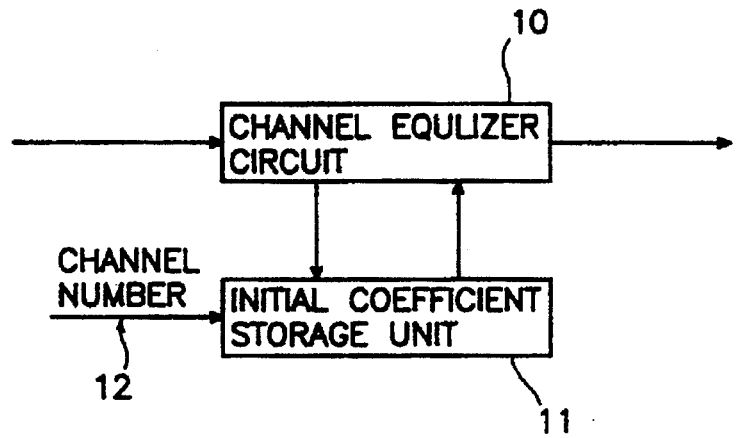
FIG. 3 is a block diagram of a channel equalizer in accordance with the present invention.

Referring to FIG. 3, there is shown a block diagram of an example of a channel equalizer in accordance with the present invention. As shown in this drawing, the channel equalizer comprises a channel equalizer circuit 10 for filtering an input signal to remove an inter-symbol interference or a noise such as a ghost due to a multi-path, and an initial coefficient storage unit 11 for storing a filtering coefficient of a certain channel, converging on an optimum value, when it is firstly selected and outputting the stored filtering coefficient to the equalizer circuit 10 when the firstly selected channel is again selected, so that it can be used as an initial filtering value.

The operation of the channel equalizer with the above-mentioned construction in accordance with the present invention will hereinafter be described in detail.

In a transmission path of a broadcasting signal between a broadcasting station and a receiver, a ghost due to a multipath of the transmission signal which results from obstacles such as buildings, mountains and etc. has little variation with time. For this reason, the coefficient of the channel equalizer has little variation under the condition that an antenna of a receiver is fixed. In this connection, the initial coefficient storage unit 11 stores the filtering coefficient of a certain channel, converging on the optimum value, when it is firstly selected and outputs the stored filtering coefficient to the equalizer circuit 10 when the firstly selected channel is again selected, so that it can be used as the initial filtering value. Namely, in the initial coefficient storage unit 11, the filtering coefficient is stored into a memory location addressed by a channel number 12. Thereafter, when a TV receiver is turned on or the channel number of the TV receiver is changed, the channel equalizer circuit 10 filters an input channel signal in response to the filtering coefficient stored in the initial coefficient storage unit 11.

Figure 4:
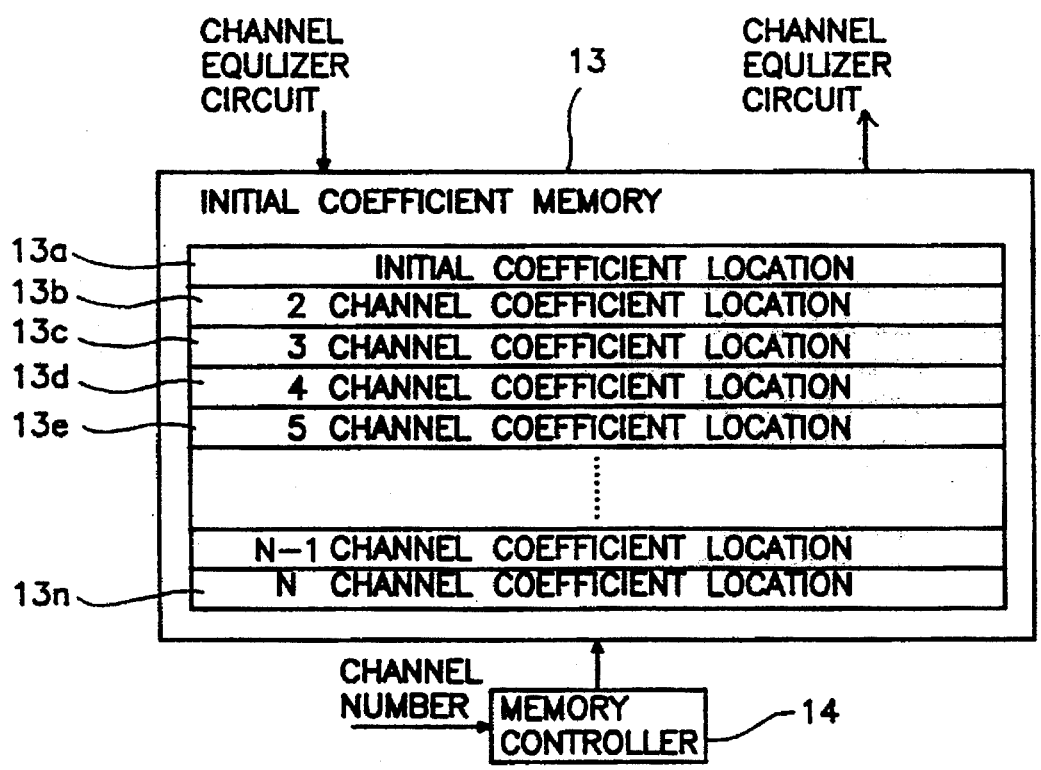
FIG. 4 is a view illustrating a construction of an initial coefficient storage unit in FIG. 3.

The initial coefficient storage unit 11 includes, as shown in FIG. 4, an initial coefficient memory 13 for storing the filtering coefficient converging on the optimum value for every channel, and a memory controller 14 for controlling the initial coefficient memory 13 to output one of the stored filtering coefficients corresponding to the channel number 12 to the channel equalizer circuit 10. The initial coefficient memory 13 stores filtering coefficients corresponding to all channels of a digital TV receiver. Upon receiving the channel number 12, the memory controller 14 controls the initial coefficient memory 13 to output one of the stored filtering coefficients corresponding to the received channel number 12 to the channel equalizer circuit 10.

The initial coefficient memory 13 includes a generally using initial coefficient location 13a for storing a coefficient in which only a center value or Co is "1" and the remaining values are all "0". The center value allows a noise component contained in the input signal to be directly inputted to the channel equalizer circuit 10. The reason is that the channel equalizer circuit 10 inputs the coefficient from the generally using initial coefficient location 13a as an initial filtering value when a certain channel is firstly selected and then obtains a filtering coefficient converging on the corresponding channel according to the inputted coefficient. Subsequently to the generally using initial coefficient location 13a, the initial coefficient memory 13 includes channel coefficient locations 13b, 13c, 13d, ..., 13n for storing the filtering coefficients corresponding to the respective channels, 2, 3, 4, ..., N-1, N. Namely, the channel coefficient locations 13b, 13c, 13d, ..., 13n store the optimum filtering coefficients converging on the respective channels, provided from the channel equalizer circuit 10. If N=83, namely, the number of the channel coefficient locations is 82, all VHF and UHF broadcasting channels can be used. In other words, because the initial coefficient corresponding to one channel is stored in one channel coefficient location, the use of the 82 channel coefficient locations can cover all the 82 channels.

The operation of the initial coefficient storage unit 11 will hereinafter be described in detail.

In the case where a channel number i is selected for the first time, the coefficient stored in the generally using initial coefficient location 13a of the initial coefficient memory 13 is outputted to the channel equalizer circuit 10 so that it can be used as an initial value for obtaining a filtering coefficient converging on the optimum value for removal of the noise component. When the filtering coefficient converging on the optimum value is obtained, it is stored into the i channel coefficient location 13i of the initial coefficient memory 13. Thereafter, when the channel number i is again selected, the filtering coefficient stored in the i channel coefficient location 13i of the initial coefficient memory 13 is outputted to the channel equalizer circuit 10 so that it can be used as the initial filtering value. As a result, the filtering coefficient can rapidly converge on the optimum value.

The memory controller 14 controls the channel coefficient locations 13b, 13c, 13d, ..., 13n of the initial coefficient memory 13 to output one of the stored filtering coefficients corresponding to the received channel number to the channel equalizer circuit 10.

Figure 1:
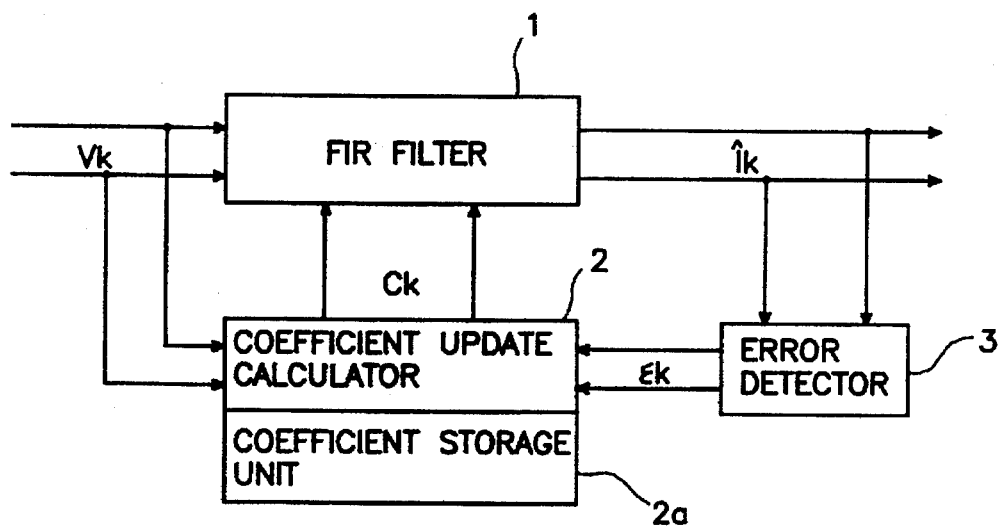
FIG. 1 is a block diagram of a conventional channel equalizer applied to a digicipher system.
Figure 5:
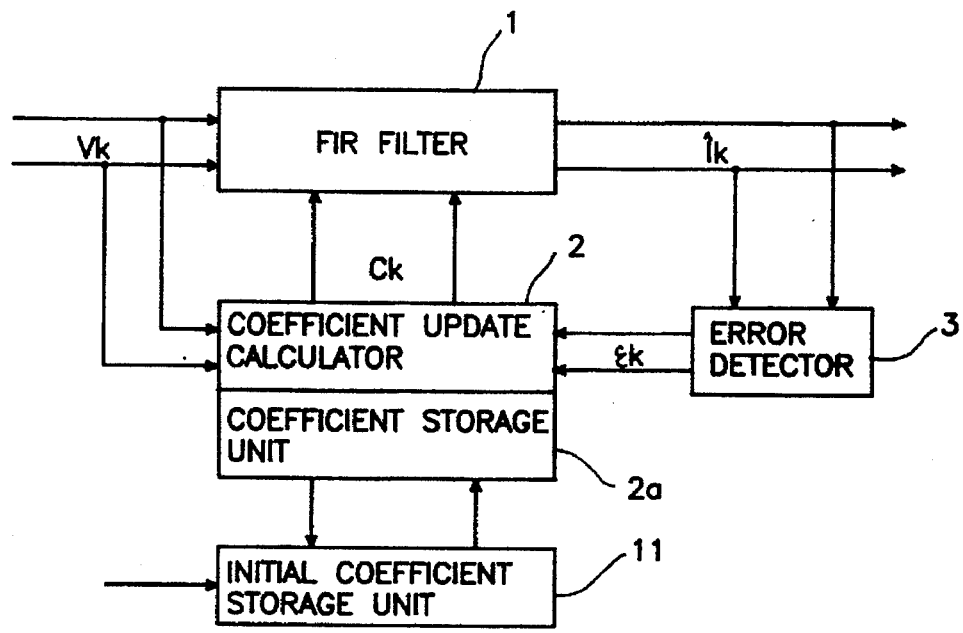
FIG. 5 is a block diagram of an example in which the channel equalizer of the present invention is applied to the digicipher system.

Referring to FIG. 5, there is shown a block diagram of an example in which the channel equalizer of the present invention is applied a the digicipher system. The construction of this drawing is substantially the same as that of FIG. 1, with the exception that the initial coefficient storage unit 11 of FIG. 3 is connected to the coefficient update calculator 2.

In operation, upon receiving the input signal $V_k$ in the form of the complex number, the FIR filter 1 filters the input signal $V_k$ by multiplying it by the updated filtering coefficient $C_k$ from the coefficient update calculator 2. The error detector 3 detects the error $\epsilon_k$ or the difference between the input signal $V_k$ and the output signal $\hat{f}_k$ from the FIR filter 1 and outputs the detected error $\epsilon_k$ to the coefficient update calculator 2. The coefficient update calculator 2 includes the coefficient storage unit 2a. The coefficient update calculator 2 updates the filtering coefficient $C_k$ in response to the input signal $V_k$, the output signal $\epsilon_k$ from the error detector 3 and the output signal from the initial coefficient storage unit 11 so that it can converge on the optimum value and outputs the updated filtering coefficient $C_k$ to the FIR filter 1. The coefficient storage unit 2a stores the updated coefficient of each step upon the filtering coefficient update and outputs the stored coefficient upon the filtering coefficient update for the next input signal.

When a certain channel is firstly selected, the coefficient update calculator 2 inputs the input signal $V_k$, the output signal $\epsilon_k$ from the error detector 3 and the filtering coefficient from the generally using initial coefficient location 13a of the initial coefficient storage unit 11 as the initial value and updates the filtering coefficient in response to the inputted signals so that it can converge on the optimum value. Then, the coefficient update calculator 2 outputs the updated filtering coefficient to the FIR filter 1. Also, the coefficient update calculator 2 outputs the converging filtering coefficient to the initial coefficient storage unit 11 to store it into the coefficient location of the corresponding channel.

Thereafter, when the firstly selected channel is again selected, the filtering coefficient stored in the coefficient location of the corresponding channel of the initial coefficient storage unit 11 is outputted to the coefficient update calculator 2 so that it can be used as the initial filtering value. Therefore, the filtering coefficient can rapidly converge on the optimum value.

Figure 2:
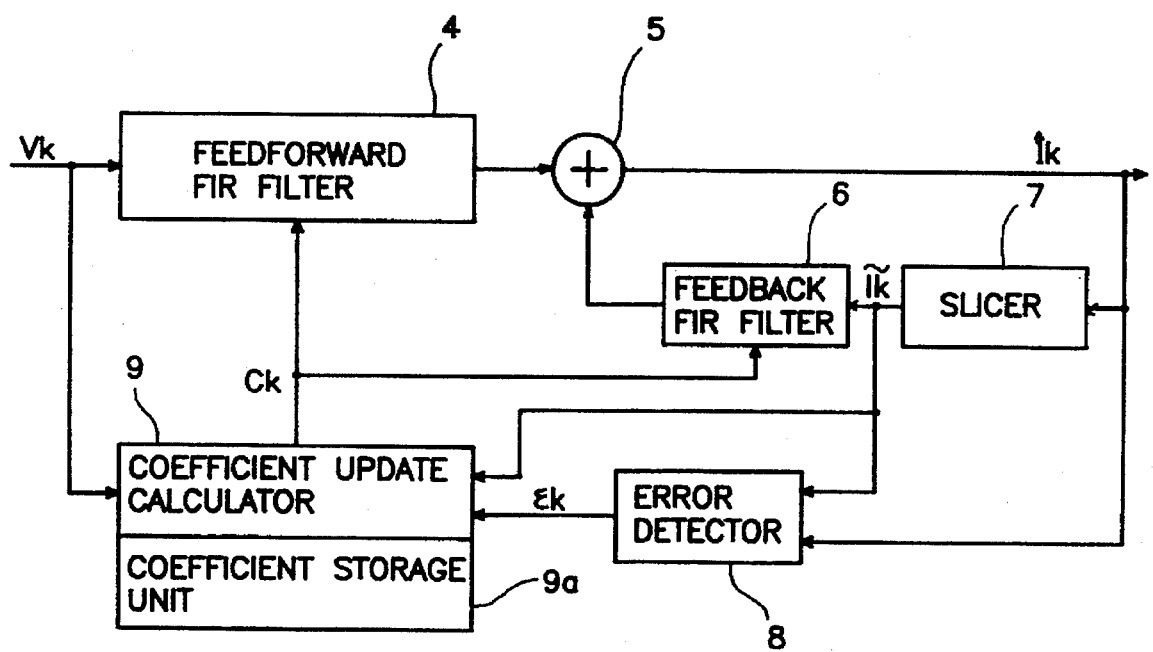
FIG. 2 is a block diagram of a conventional channel equalizer applied to a DSC-HDTV.
Figure 6:
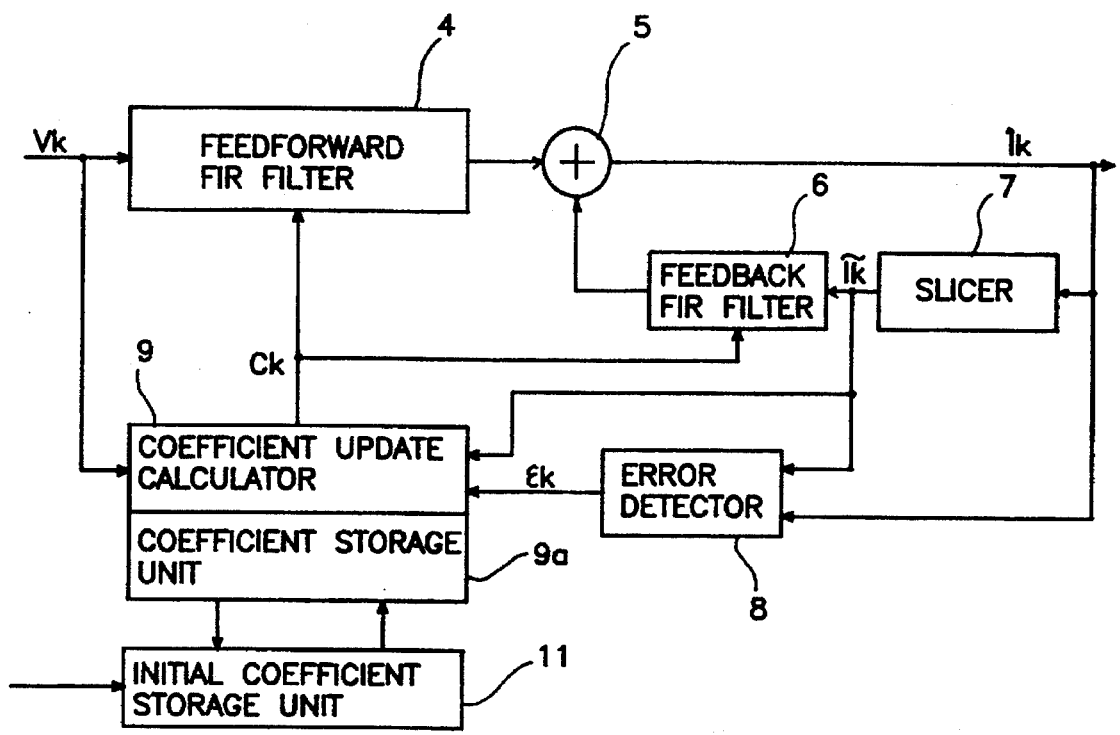
FIG. 6 is a block diagram of another example in which the channel equalizer of the present invention is applied to the DSC-HDTV.

Referring to FIG. 6, there is shown a block diagram of another example in which the channel equalizer of the present invention is applied to the DSC-HDTV. The construction of this drawing is substantially the same as that of FIG. 2, with the exception that the initial coefficient storage unit 11 of FIG. 3 is connected to the coefficient update calculator 9.

In operation, the feedforward FIR filter 4 performs the filtering operation for the input signal $V_k$ by multiplying it by the updated filtering coefficient $C_k$ from the coefficient update calculator 9. The feedback FIR filter 6 performs the filtering operation for the output value $\tilde{I}_k$ from the slicer 7, which slices the output signal $\hat{I}_k$ from the adder 5, by multiplying it by the updated filtering coefficient $C_k$ from the coefficient update calculator 9. The adder 5 adds the output signal from the feedforward FIR filter 4 to the output signal from the feedback FIR filter 6 to provide the output signal $\hat{I}_k$ of the channel equalizer. The error detector 8 detects the error $\epsilon_k$ between the input signal $V_k$ and the output signal $\hat{I}_k$ of the channel equalizer and outputs the detected error $\epsilon_k$ to the coefficient update calculator 9. The coefficient update calculator 9 includes the coefficient storage unit 9a. The coefficient update calculator 9 updates the filtering coefficient $C_k$ in response to the input signal $V_k$, the output signal $\epsilon_k$ from the error detector 8, the output value $\tilde{I}_k$ from the slicer 7 and the output signal from the initial coefficient storage unit 11 so that it can converge on the optimum value and outputs the updated filtering coefficient $C_k$ to the feedforward FIR filter 4 and the feedback FIR filter 6. The coefficient storage unit 9a stores the updated coefficient of each step upon the filtering coefficient update and outputs the stored coefficient upon the filtering coefficient update for the next input signal.

When a certain channel is firstly selected, the coefficient update calculator 9 inputs the input signal $V_k$, the output signal $\epsilon_k$ from the error detector 8 and the filtering coefficient from the generally using initial coefficient location 13a of the initial coefficient storage unit 11 as the initial value and updates the filtering coefficient in response to the inputted signals so that it can converge on the optimum value. Then, the coefficient update calculator 9 outputs the updated filtering coefficient to the feedforward FIR filter 4 and the feedback FIR filter 6. Also, the coefficient update calculator 9 outputs the converging filtering coefficient to the initial coefficient storage unit 11 to store it into the coefficient location of the corresponding channel.

Thereafter, when the firstly selected channel is again selected, the filtering coefficient storm in the coefficient location of the corresponding channel of the initial coefficient storage unit 11 is outputted to the coefficient update calculator 9 so that it can be used as the initial filtering value. In result, the filtering coefficient can rapidly converge on the optimum value.

As apparent from the above description, according to the present invention, when the TV receiver is turned on or the channel number of the TV receiver is changed, a picture of the corresponding channel appears on a screen of the TV receiver with no delay time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A channel equalizer for a digital television receiver which receives and filters a digital input signal to remove a noise component mixed therewith during transmission, comprising:

channel equalizing means for filtering the received digital input signal; and initial coefficient storage means for storing a predetermined coefficient for all channels of the digital television receiver, outputting the predetermined coefficient to said channel equalization means when any one of the channels is selected for a first time so that the predetermined coefficient is used as an initial filtering value for said channel equalization means to update a filtering coefficient of said channel equalizing means by converging the filtering coefficient on an optimum value, storing the converged filtering coefficient generated from said channel equalization means using the predetermined coefficient, and outputting the stored filtering coefficient to said channel equalization means when said one of the channels is selected again, whereby the converged filtering coefficient is used as the initial filtering value for said initial coefficient storage means to update the filtering coefficient when said one of the channels is selected again.

2. The channel equalizer for a digital television receiver as set forth in claim 1, wherein said initial coefficient storage means includes:

an initial coefficient memory for storing the filtering coefficient converging on the optimum value for every channel; and a memory controller for controlling said initial coefficient memory to output one of the stored filtering coefficients corresponding to a channel number to said channel equalization means.

3. The channel equalizer for a digital television receiver as set forth in claim 2, wherein said initial coefficient memory includes:

an initial coefficient location for storing said predetermined coefficient and outputting the stored predetermined coefficient to said channel equalization means when said any one of the channels is selected for the first time; and a plurality of channel coefficient locations, each of said plurality of channel coefficient locations storing the filtering coefficient converging on the optimum value for a corresponding channel.

4. The channel equalizer for a digital television receiver as set forth in claim 3, wherein said plurality of channel coefficient locations are 82 in number.

5. The channel equalizer as set forth in claim 3, wherein when said one of the channels is selected again, said channel equalization means updates the filtering coefficient using the filtering coefficient stored in one of the plurality of channel coefficient locations which corresponds to said one of the channels selected again.

6. The channel equalizer as set forth in claim 1, wherein said predetermined coefficient has a center value which is one and remaining values which are zero.

7. A channel equalizer for a digital television receiver which receives a digital input signal, comprising:

FIR filtering means for filtering the received digital input signal;

error detection means for detecting a difference between the received digital input signal and an output signal from said FIR filtering means;

coefficient update calculation means for updating a filtering coefficient in response to the received digital input signal, an output signal from initial coefficient storage means, and an output signal from said error detection means by converging the filtering coefficient on an optimum value, and outputting the updated filtering coefficient to said FIR filtering means; and the initial coefficient storage means for storing a predetermined coefficient for all channels of the digital television receiver, outputting the predetermined coefficient as the output signal of the initial coefficient storage means to said coefficient update calculation means when any one of the channels of the digital television receiver is selected for a first time so that the predetermined coefficient is used as an initial filtering value for said coefficient update calculation means to update the filtering coefficient with the received digital input signal and the output signal from said error detections means, storing the converged filtering coefficient generated from said coefficient update calculation means using the predetermined coefficient, and outputting the stored filtering coefficient to said coefficient update calculation means as the output signal of the initial coefficient storage means when said one of the channels is selected again, whereby the converged filtering coefficient is used as the initial filtering value for said coefficient update calculation means to update the filtering coefficient when said one of the channels is selected again.

8. The channel equalizer as set forth in claim 7, wherein said initial coefficient storage means includes:

an initial coefficient memory for storing the filtering coefficient converging on the optimum value for every channel; and a memory controller for controlling said initial coefficient memory to output one of the stored filtering coefficients corresponding to a channel number to said coefficient update calculation means.

9. The channel equalizer as set forth in claim 8, wherein said initial coefficient memory includes:

an initial coefficient location for storing said predetermined coefficient and outputting the stored predetermined coefficient to said coefficient update calculation means when said any one of the channels is selected for the first time; and a plurality of channel coefficient locations, each of said plurality of channel coefficient locations storing the filtering coefficient converging on the optimum value for a corresponding channel.

10. The channel equalizer as set forth in claim 9, wherein said plurality of channel coefficient locations are 82 in number.

11. The channel equalizer as set forth in claim 9, wherein when said one of the channels is selected again, said coefficient update calculation means updates the filtering coefficient using the filtering coefficient stored in one of the plurality of channel coefficient locations which corresponds to said one of the channels selected again.

12. The channel equalizer as set forth in claim 7, wherein said predetermined coefficient has a center value which is one and remaining values which are zero.

13. A channel equalizer for a digital television receiver which receives a digital input signal, comprising:

feed forward FIR filtering means for filtering the received digital input signal;

slicing means for slicing an output signal of the channel equalizer;

feedback FIR filtering means for filtering an output signal from said slicing means;

addition means for adding an output signal from said feedforward FIR filtering means to an output signal from said feedback FIR filtering means to provide the output signal of the channel equalizer;

error detection means for detecting a difference between the output signal from said addition means and the output signal from said slicing means to detect an error between the input signal and the output signal of the channel equalizer;

coefficient update calculation means for updating a filtering coefficient in response to the digital input signal, an output signal from initial coefficient storage means, an output signal from said error detection means and an output signal from said slicing means so that the filtering can converge on an optimum value and outputting the updated filtering coefficient to said feedforward FIR filtering means and said feedback FIR filtering means; and the initial coefficient storage means for storing a predetermined coefficient for all channels of the digital television receiver, outputting the predetermined coefficient as the output signal of the initial coefficient storage means to said coefficient update calculation means when any one of the channels of the digital television receiver is selected for a first time so that the predetermined coefficient is used as an initial filtering value for said coefficient update calculation means to update the filtering coefficient with the digital input signal, the output signal from said error detection means and the output signal from said slicing means, storing the converged filtering coefficient generated from said coefficient update calculation means using the predetermined coefficient, and outputting the stored filtering coefficient to said coefficient update calculation means as the output signal of the initial coefficient storage means when said one of the channels is selected again, whereby the converged filtering coefficient is used as the initial filtering value for said coefficient update calculation means to update the filtering coefficient when said one of the channels is selected again.

14. The channel equalizer as set forth in claim 13, wherein said initial coefficient storage means includes:

an initial coefficient memory for storing the filtering coefficient converging on the optimum value for every channel; and a memory controller for controlling said initial coefficient memory to output one of the stored filtering coefficients corresponding to a channel number to said coefficient update calculation means.

15. The channel equalizer as set forth in claim 14, wherein said initial coefficient memory includes:

an initial coefficient location for storing said predetermined coefficient and outputting the stored predetermined coefficient to said coefficient update calculation means when said any one of the channels is selected for the first time; and a plurality of channel coefficient locations, each of said plurality of channel coefficient locations storing the filtering coefficient converging on the optimum value for a corresponding channel.

16. The channel equalizer as set forth in claim 15, wherein said plurality of channel coefficient locations are 82 in number.

17. The channel equalizer as set forth in claim 15, wherein when said one of the channels is selected again, said coefficient update calculation means updates the filtering coefficient using the filtering coefficient stored in one of the plurality of channel coefficient locations which corresponds to said one of the channels selected again.

18. The channel equalizer as set forth in claim 13, wherein said predetermined coefficient has a center value which is one and remaining values which are zero.

\* \* \* \* \*